(12) United States Patent
Gupta et al.

(10) Patent No.: US 9,058,191 B2
(45) Date of Patent: Jun. 16, 2015

(54) DIRECT TRANSFER OF EXECUTABLE SOFTWARE IMAGE TO MEMORY ALLOCATED BY TARGET PROCESSOR BASED ON TRANSFERRED IMAGE HEADER

(75) Inventors: Nitin Gupta, San Diego, CA (US);
Daniel H. Kim, San Diego, CA (US);
Igor Malamant, San Diego, CA (US);
Steve Haehnichen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 13/310,928

(22) Filed: Dec. 5, 2011

(65) Prior Publication Data

US 2012/0089814 A1 Apr. 12, 2012

Related U.S. Application Data

(63) Continuation-in-part of application No. 13/052,516, filed on Mar. 21, 2011, now Pat. No. 8,838,949.

(60) Provisional application No. 61/316,369, filed on Mar. 22, 2010, provisional application No. 61/324,035, filed on Apr. 14, 2010, provisional application No. 61/324,122, filed on Apr. 14, 2010, provisional application No. 61/325,519, filed on Apr. 19, 2010.

(51) Int. Cl.
*G06F 15/16* (2006.01)
*G06F 9/06* (2006.01)
*G06F 9/445* (2006.01)
*G06F 9/44* (2006.01)

(52) U.S. Cl.
CPC . *G06F 9/445* (2013.01); *G06F 9/06* (2013.01); *G06F 9/4405* (2013.01)

(58) Field of Classification Search
None
See application file for complete search history.

(56) References Cited

U.S. PATENT DOCUMENTS

| 5,978,589 | A | * | 11/1999 | Yoon | 717/178 |
| 6,079,017 | A | * | 6/2000 | Han et al. | 713/2 |
| 7,447,846 | B2 | | 11/2008 | Yeh | |
| 7,765,391 | B2 | | 7/2010 | Uemura et al. | |
| 2002/0138156 | A1 | | 9/2002 | Wong et al. | |
| 2006/0168435 | A1 | | 7/2006 | Svensson et al. | |
| 2008/0168443 | A1 | | 7/2008 | Brokenshire et al. | |

(Continued)

FOREIGN PATENT DOCUMENTS

| CN | 1595372 A | 3/2005 |
| CN | 101107592 A | 1/2008 |

(Continued)

OTHER PUBLICATIONS

International Search Report and Written Opinion—PCT/US2011/029484—ISA/EPO—May 30, 2011.

(Continued)

*Primary Examiner* — Kenneth Kim
(74) *Attorney, Agent, or Firm* — Nicholas J. Pauley; Peter Michael Kamarchik; Paul Holdaway

(57) ABSTRACT

In a multiprocessor system, a primary processor may store an executable image for a secondary processor. A communication protocol assists the transfer of an image header and data segment(s) of the executable image from the primary processor to the secondary processor. Messages between the primary processor and secondary processor indicate successful receipt of transferred data, termination of a transfer process, and acknowledgement of same.

30 Claims, 7 Drawing Sheets

(56) References Cited

U.S. PATENT DOCUMENTS

| | | |
|---|---|---|
| 2009/0204751 A1 | 8/2009 | Kushita |
| 2010/0077130 A1 | 3/2010 | Kwon |
| 2011/0035575 A1 | 2/2011 | Kwon |
| 2012/0072710 A1 | 3/2012 | Gupta et al. |

FOREIGN PATENT DOCUMENTS

| | | |
|---|---|---|
| CN | 101387952 A | 3/2009 |
| EP | 2034416 A1 | 3/2009 |
| JP | S63233460 A | 9/1988 |
| JP | H06195310 A | 7/1994 |
| JP | H08161283 A | 6/1996 |
| JP | H09244902 A | 9/1997 |
| JP | 2000020492 A | 1/2000 |
| JP | 2004086447 A | 3/2004 |
| JP | 2004252990 A | 9/2004 |
| JP | 2005122759 A | 5/2005 |
| JP | 2007157150 A | 6/2007 |
| KR | 20070097538 A | 10/2007 |
| WO | 2006077068 | 7/2006 |
| WO | 2008001671 A1 | 1/2008 |

OTHER PUBLICATIONS

International Search Report and Written Opinion—PCT/US2012/068052—ISA/EPO—Feb. 25, 2013.

* cited by examiner

DIRECT TRANSFER OF EXECUTABLE SOFTWARE IMAGE TO MEMORY ALLOCATED BY TARGET PROCESSOR BASED ON TRANSFERRED IMAGE HEADER

CROSS REFERENCE TO RELATED APPLICATIONS

This application is a continuation-in-part of U.S. patent application Ser. No. 13/052,516 filed Mar. 21, 2011, in the names of GUPTA et al. which claims the benefit of U.S. provisional patent application No. 61/316,369 filed Mar. 22, 2010, in the names of MALAMANT et al., U.S. provisional patent application No. 61/324,035 filed Apr. 14, 2010, in the names of GUPTA et al., U.S. provisional patent application No. 61/324,122 filed Apr. 14, 2010, in the names of GUPTA et al., and U.S. provisional patent application No. 61/325,519 filed Apr. 19, 2010, in the names of GUPTA et al., the disclosures of which are expressly incorporated herein by reference in their entireties.

TECHNICAL FIELD

The following description relates generally to multi-processor systems, and more specifically to multi-processor systems in which a primary processor is coupled to a non-volatile memory storing executable software image(s) of one or more other processors (referred to herein as "secondary" processors) in the system which are each coupled to a dedicated volatile memory, wherein the executable software images are efficiently communicated from the primary processor to the secondary processor(s) in a segmented format (e.g., using a direct scatter load process).

BACKGROUND

Processors execute software code to perform operations. Processors may use particular software code, commonly referred to as boot code, to be executed for booting up. In a multi-processor system, each processor may use respective boot code for booting up. As an example, in a smartphone device that includes an application processor and a modem processor, each of the processors may use respective boot code for booting up.

A problem exists on a significant number of devices (such as smart phones) that incorporate multiple processors (e.g., a standalone application processor chip integrated with a separate modem processor chip). A flash/non-volatile memory component may be used for each of the processors, because each processor has non-volatile memory (e.g., persistent storage) of executable images and file systems. For instance, a processor's boot code may be stored to the processor's respective non-volatile memory (e.g., Flash memory, read-only memory (ROM), etc.), and upon power-up the boot code software is loaded for execution by the processor from its respective non-volatile memory. Thus, in this type of architecture the executable software, such as a processor's boot code, is not required to be loaded to the processor from another processor in the system.

Adding dedicated non-volatile memory to each processor, however, occupies more circuit board space, thereby increasing the circuit board size. Some designs may use a combined chip for Random Access Memory (RAM) and Flash memory (where RAM and Flash devices are stacked as one package to reduce size) to reduce board size. While multi-chip package solutions do reduce the needed circuit board foot print to some extent, it may increase costs.

In some multi-processor systems, software may be loaded to one processor from another processor. For example, suppose a first processor in a multi-processor system is responsible for storing to its non-volatile memory boot code for one or more other processors in the system; wherein upon power-up the first processor is tasked with loading the respective boot code to the other processor(s), as opposed to such boot code residing in non-volatile memory of the other processor(s). In this type of system, the software (e.g., boot image) is downloaded from the first processor to the other processor(s) (e.g., to volatile memory of the other processor(s)), and thereafter the receiving processor(s) boots with the downloaded image.

Often, the software image to be loaded is a binary multi-segmented image. For instance, the software image may include a header followed by multiple segments of code. When software images are loaded from an external device (e.g., from another processor) onto a target device (e.g., a target processor) there may be an intermediate step where the binary multi-segmented image is transferred into the system memory and then later transferred into target locations by the boot loader.

In a system in which the software image is loaded onto a target "secondary" processor from a first "primary" processor, one way of performing such loading is to allocate a temporary buffer into which each packet is received, and each packet would have associated packet header information along with the payload. The payload in this case would be the actual image data. From the temporary buffer, some of the processing may be done on the payload, and then the payload may get copied over to the final destination. The temporary buffer may be located in system memory, such as in internal random-access-memory (RAM) or double data rate (DDR) memory, for example.

Thus, where an intermediate buffer is used, the data being downloaded from a primary processor to a secondary processor is copied into the intermediate buffer. In this way, the buffer is used to receive part of the image data from the primary processor, and from the buffer the image data may be scattered into the memory (e.g., volatile memory) of the secondary processor.

The primary processor and its non-volatile memory that stores the boot image for a secondary processor may be implemented on a different chip than a chip on which the secondary processor is implemented. Thus, in order to transfer the data from the primary processor's non-volatile memory to the secondary processor (e.g., to the secondary processor's volatile memory), a packet-based communication may be employed, wherein a packet header is included in each packet communicated to the secondary processor. The packets are stored in an intermediate buffer, and some processing of the received packets is performed so that the data may be stored in its final destination (e.g., within the secondary processor's volatile memory).

SUMMARY

A communication method between two processors in a multi-processor system is offered. The method includes initiating, by a secondary processor, communications with a primary processor. The method also includes instructing, by the secondary processor, the primary processor to transfer an image header for an executable software image. The executable software image includes the image header and data segment(s). The method further includes receiving, by the secondary processor, the image header and data segment(s). The method still further includes indicating, by the secondary processor, to the primary processor, successful receipt of the image header and data segment(s). The method further includes receiving, by the secondary processor, from the primary processor an indication of termination of the executable software image transfer. The method also includes acknowledging, by the secondary processor, to the primary processor receipt of the indication of termination of transfer.

A multiple processor device is offered. The device includes means for initiating, by a secondary processor, communications with a primary processor. The device also includes means for instructing, by the secondary processor, the primary processor to transfer an image header for an executable software image. The executable software image includes the image header and data segment(s). The device further includes means for receiving, by the secondary processor, the image header and data segment(s). The device still further includes means for indicating, by the secondary processor, to the primary processor, successful receipt of the image header and data segment(s). The device further includes means for receiving, by the secondary processor, from the primary processor an indication of termination of the executable software image transfer. The device also includes means for acknowledging, by the secondary processor, to the primary processor receipt of the indication of termination of transfer.

A computer program product is offered. The computer program product includes a non-transitory computer-readable medium having non-transitory program code recorded thereon. The non-transitory program code includes program code to initiate, by a secondary processor, communications with a primary processor. The non-transitory program code further includes program code to instruct, by the secondary processor, the primary processor to transfer an image header for an executable software image. The executable software image includes an image header and data segment(s). The non-transitory program code further includes program code to receive, by the secondary processor, the image header and data segment(s). The non-transitory program code still further includes program code to indicate, by the secondary processor, to the primary processor, successful receipt of the image header and at least one data segment. The non-transitory program code further includes program code to receive, by the secondary processor, from the primary processor an indication of termination of the executable software image transfer. The non-transitory program code also includes program code to acknowledge, by the secondary processor, to the primary processor receipt of the indication of termination of transfer.

A communication method between two processors in a multi-processor system is offered. The method includes receiving, by a primary processor, an instruction to transfer an image header for an executable software image. The executable software image includes the image header and data segment(s). The method also includes sending, by the primary processor, the image header and data segment(s) to a secondary processor. The method further includes receiving, by the primary processor, an indication from the secondary processor of successful receipt of the image header and data segment(s). The method still further includes sending, by the primary processor, an indication of termination of the executable image transfer. The method also includes receiving, by the primary processor, an acknowledgment from the secondary processor of receipt of the indication of termination of transfer.

A multiple processor device is offered. The device includes means for receiving, by a primary processor, an instruction to transfer an image header for an executable software image. The executable software image includes the image header and data segment(s). The device also includes means for sending, by the primary processor, the image header and data segment(s) to a secondary processor. The method further includes means for receiving, by the primary processor, an indication from the secondary processor of successful receipt of the image header and data segment(s). The device still further includes means for sending, by the primary processor, an indication of termination of the executable image transfer. The device also includes means for receiving, by the primary processor, an acknowledgment from the secondary processor of receipt of the indication of termination of transfer.

A computer program product is offered. The computer program product includes a non-transitory computer-readable medium having non-transitory program code recorded thereon. The non-transitory program code includes program code to receive, by a primary processor, an instruction to transfer an image header for an executable software image, said executable software image comprising said image header and data segment(s). The non-transitory program code also includes program code to send, by the primary processor, the image header and data segment(s) to a secondary processor. The non-transitory program code further includes program code to receive, by the primary processor, an indication from the secondary processor of successful receipt of the image header and at least one data segment. The non-transitory program code still further includes program code to send, by the primary processor, an indication of termination of the executable image transfer. The non-transitory program code still further includes program code to receive, by the primary processor, an acknowledgment from the secondary processor of receipt of the indication of termination of transfer.

BRIEF DESCRIPTION OF THE DRAWINGS

For a more complete understanding of the present teachings, reference is now made to the following description taken in conjunction with the accompanying drawings.

DETAILED DESCRIPTION

The word "exemplary" is used herein to mean "serving as an example, instance, or illustration." Any aspect described herein as "exemplary" is not necessarily to be construed as preferred or advantageous over other aspects.

Certain aspects disclosed herein concern multi-processor systems where one primary processor is connected to a non-volatile memory storing executable images of one or more other processors (referred to herein as "secondary" processors) in the system. In such a multi-processor system each of the secondary processors may be connected to a dedicated volatile memory used for storing executable images, run-time data, and optionally a file system mirror.

Executable images are often stored in a segmented format where each segment can be loaded into a different memory region. Target memory locations of executable segments may or may not be contiguous with respect to each other. One example of a multi-segmented image format is Executable and Linking Format (ELF) which allows an executable image to be broken into multiple segments and each one of these segments may be loaded into different system memory locations.

In one exemplary aspect a direct scatter load technique is disclosed for loading a segmented image from a primary processor's non-volatile memory to a secondary processor's volatile memory. As discussed further below, the direct scatter load technique avoids use of a temporary buffer. For instance, in one aspect, rather than employing a packet-based communication in which the image is communicated via packets that each include a respective header, the raw image data is loaded from the primary processor to the secondary processor. In another aspect, headers are used which include information used to determine the target location information for the data.

Figure 1:
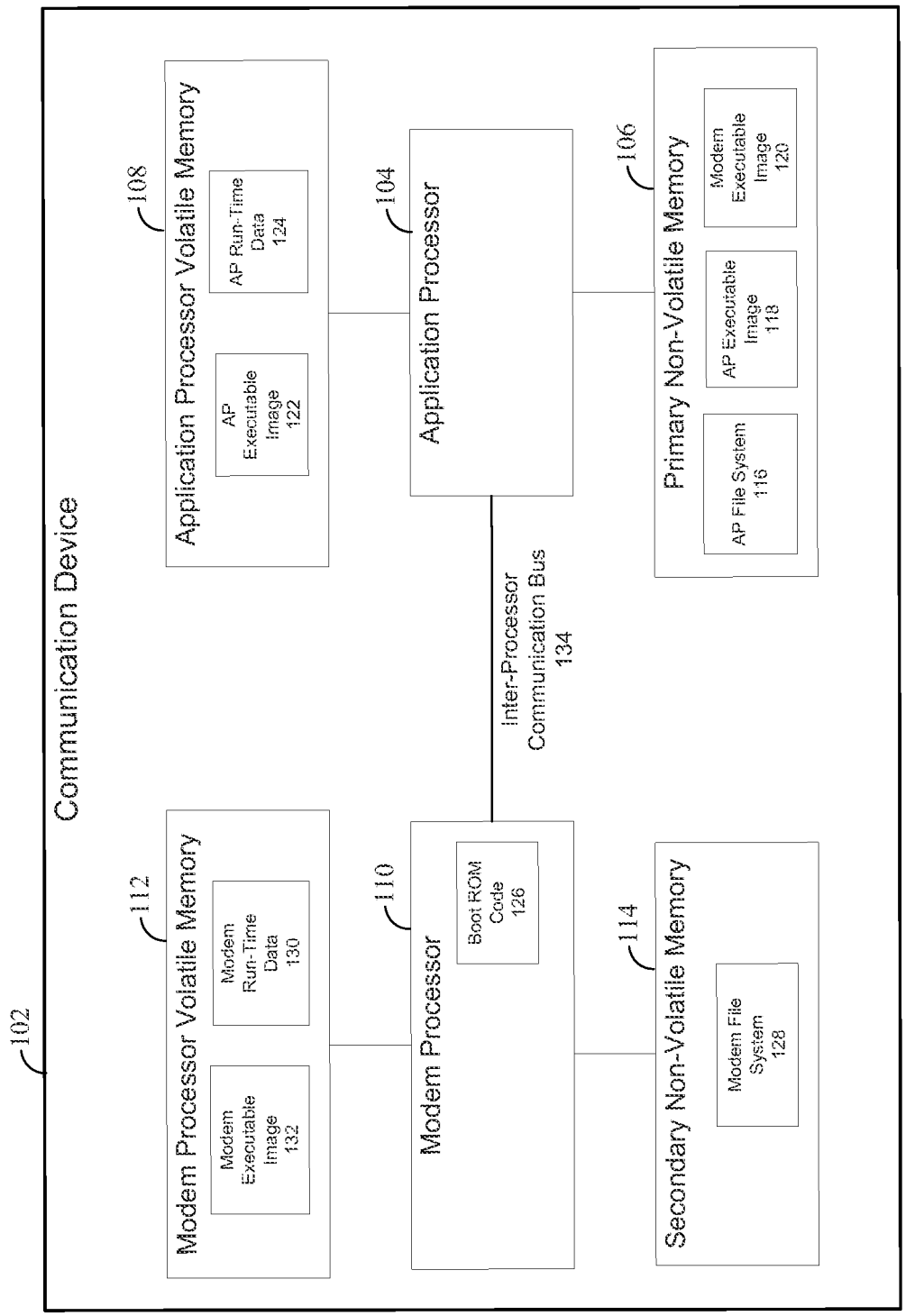
FIG. 1 is an illustration of an exemplary device within which aspects of the present disclosure may be implemented.

Exemplary Multi-Processor Architecture with Centralized Non-Volatile Memory—with Reduced Localized Non-Volatile Memory for File System FIG. 1 illustrates a block diagram of a first multi-processor architecture 102 in which a primary processor (application processor 104) hosts a primary (large) nonvolatile memory 106 (e.g., NAND flash memory) while a second processor (e.g., modem processor 110) has a secondary (reduced or minimal) non-volatile memory 114 (e.g., NOR flash memory).

In the communication device architecture 102, the application processor 104 is coupled to a primary non-volatile memory 106 and an application processor volatile memory 108 (e.g., random access memory). The modem processor 110 is coupled to a secondary non-volatile memory 114 and a modem processor volatile memory 112. An inter-processor communication bus 134 allows communications between the application processor 104 and the modem processor 110.

A modem executable image 120 for the modem processor 110 may be stored in the application processor (AP) non-volatile memory 106 together with the AP executable image 118 and the AP file system 116. The application processor 104 may load its AP executable image 118 into the application processor volatile memory 108 and store it as AP executable image 122. The application processor volatile memory 108 may also serve to store AP run-time data 124.

The modem processor 110 has the dedicated secondary (reduced or minimal) non-volatile memory 114 (e.g., NOR flash) for its file system 128 storage. This secondary (reduced or minimal) non-volatile memory 114 is smaller and lower cost than a flash device capable of storing both the run-time modem executable images 120 and the file system 128.

Upon system power-up, the modem processor 110 executes its primary boot loader (PBL) from the hardware boot ROM 126 (small read-only on-chip memory). The modem PBL may be adapted to download the modem executables 120 from the application processor 104. That is, the modem executable image 120 (initially stored in the primary non-volatile memory 106) is requested by the modem processor 110 from the application processor 104. The application processor 104 retrieves the modem executable image 120 and provides it to the modem processor 110 via an inter-processor communication bus 134 (e.g., inter-processor communication bus). The modem processor 110 stores the modem executable image 132 directly into the modem processor RAM (Random Access Memory) 112 to the final destination without copying the data into a temporary buffer in the modem processor RAM 112. The inter-processor communication bus 134 may be, for example, a HSIC bus (USB-based High Speed Inter-Chip), an HSI bus (MIPI High Speed Synchronous Interface), a SDIO bus (Secure Digital I/O interface), a UART bus (Universal Asynchronous Receiver/Transmitter), an SPI bus (Serial Peripheral Interface), an I2C bus (Inter-Integrated Circuit), or any other hardware interface suitable for inter-chip communication available on both the modem processor 110 and the application processor 104.

Once the modem executable image 120 is downloaded into the modem processor RAM 112 and authenticated, it is maintained as a modem executable image 132. Additionally, the modem processor volatile memory 112 may also store modem run-time data 130. The modem Boot ROM code 126 may then jump into that modem executable image 132 and start executing the main modem program from the modem processor RAM 112. Any persistent (non-volatile) data, such as radio frequency (RF) calibration and system parameters, may be stored on the modem file system 128 using the secondary (reduced or minimal) non-volatile memory 114 attached to the modem processor 110.

Figure 2:
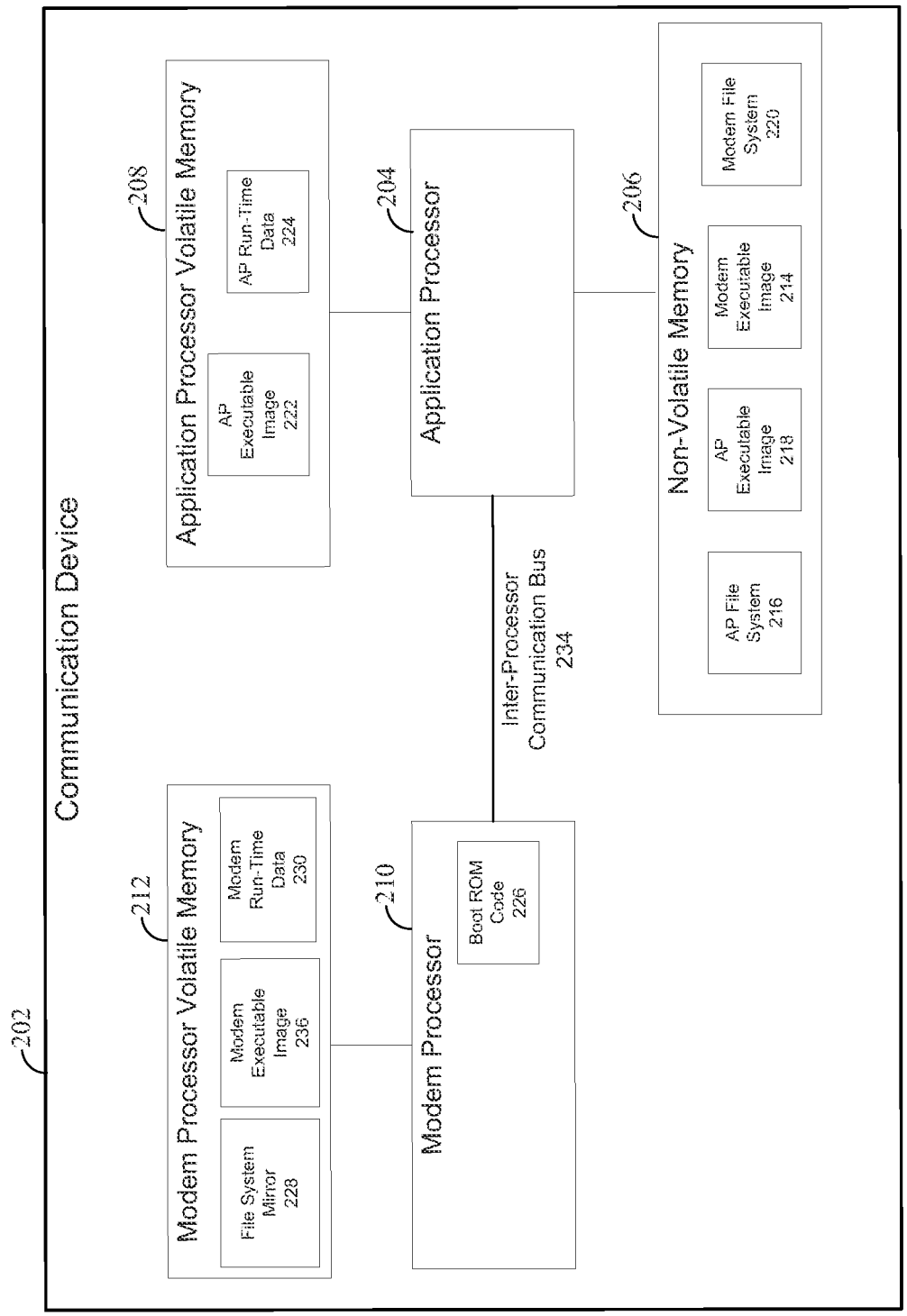
FIG. 2 is an illustration of an exemplary device within which aspects of the present disclosure may be implemented.

Exemplary Multi-Processor Architecture with Centralized Non-Volatile Memory—with No Localized Non-Volatile Memory for File Systems FIG. 2 illustrates a block diagram of a second multi-processor architecture 202 in which a primary processor (application processor 204) hosts a primary (large) non-volatile memory 206 (e.g., NAND flash memory). The primary non-volatile memory 206 may store a modem-executable image 214 and/or a modem file system 220 for the secondary processor (modem processor 210). The secondary processor (modem processor 210) may be configured to request the modem-executable image 214 and/or modem file system 220 from the primary processor 204. The primary processor 204 then retrieves the requested modem-executable image 214 and/or modem file system 220 from the non-volatile memory 206 and provides it to the secondary processor 210 via an inter-processor communication bus 234.

In this architecture 202, the application processor 204 is coupled to the non-volatile memory 206 and an application processor volatile memory 208 (e.g., random access memory). The modem processor 210 is coupled to a modem processor volatile memory 212 but does not have its own non-volatile memory. The modem processor volatile memory 212 stores a file system mirror 228, a modem executable image 236, and modem run-time data 230. The inter-processor communication bus 234 allows communications between the application processor 204 and modem processor 210.

All the executable images 214 and file system 220 for the modem processor 210 may be stored in the non-volatile memory 206 together with the AP executable image 218 and the AP file system 216. The application processor 204 may load its AP executable image 218 into the application processor volatile memory 208 and store it as AP executable image 222. The application processor volatile memory 208 may also serve to store AP run-time data 224. The modem file system may be encrypted with a modem processor's private key for privacy protection and prevention of subscriber identity cloning.

Upon system power-up, the modem Boot ROM code 226 downloads both the modem executable image 214 and the modem file system 220 from the application processor 204 into the modem processor volatile memory 212. During normal operation, any read accesses to the modem file system 228 are serviced from the modem processor volatile memory 212. Any write accesses are performed in the modem processor volatile memory 212 as well. In addition, there may be a background process running on the modem processor 210 and the application processor 204 to synchronize the contents of the File System 228 in modem processor volatile memory 212 with the modem file system 220 stored on the non-volatile memory 206.

The primary and secondary processors may periodically synchronize the file system in the volatile memory for the secondary processor with the corresponding file system in the primary non-volatile memory. The first write to the modem file system 228 may start a timer (for example, a ten minute timer) in the modem processor 210. While this timer is running, all writes to the file system 228 are coalesced into the modem processor volatile memory 212. Upon expiration of the timer, the modem processor 210 copies the file system image 228 from volatile memory 212, encrypts it, and alerts the application processor 204 that new data is available. The application processor 204 reads the encrypted copy and writes it to the non-volatile memory 206 into the modem file system 220. The application processor 204 then signals the modem processor 210 that the write operation is complete. If a synchronization operation fails, a present version of the modem file system may be used, meaning the modem processor 210 may continued to execute with the image currently residing in its own volatile memory rather than reloading an image from the application processor 204. Synchronization may occur periodically (for example, every ninety seconds) or after a certain time following a write operation by the modem to its file system. To prevent corruption from circumstances such as sudden power removal, two copies of the modem file system 220 may be stored.

The modem processor 210 may also initiate a "flush" operation of the file system mirror 228 to the application processor's non-volatile memory 206. This may occur for a number of reasons, including phone power-off, as well as sending an acknowledgement message to the network to indicate acceptance and storage of incoming SMS messages.

File system read operations on the modem processor 210 are serviced from the modem processor volatile memory 212, which reflects the current state of the modem file system. Because read operations are more frequent than write operations, and write operations tend to occur in "bursts" of activity, the overall system load and power consumption may be reduced.

The application processor 204, modem processor 210, and Boot loader have specific measures in place to ensure that there is always at least one complete file system image available in the non-volatile memory 206 at all times. This provides immunity to power-loss or surprise-reset scenarios.

Application of the concepts disclosed herein are not limited to the exemplary system shown above but may likewise be employed with various other multi-processor systems.

Zero Copy Transport Flow

Aspects of the present disclosure provide techniques for efficiently loading the executable software images from the primary processor's non-volatile memory to the secondary processor's volatile memory. As mentioned above, conventional loading processes required an intermediate step where the binary multi-segmented image is buffered (e.g., transferred into the system memory) and then later scattered into target locations (e.g., by a boot loader). Aspects of the present disclosure provide techniques that alleviate the intermediate step of buffering required in conventional loading processes. Thus, aspects of the present disclosure avoid extra memory copy operations, thereby improving performance (e.g., reducing the time required to boot secondary processors in a multi-processor system).

As discussed further below, one exemplary aspect of the present disclosure employs a direct scatter load technique for loading the executable software images from the primary processor's non-volatile memory to the secondary processor's volatile memory. Certain aspects of the present disclosure also enable concurrent image transfers with post-transfer data processing, such as authentication, which may further improve efficiency, as discussed further below.

In one aspect, the host primary processor does not process or extract any information from the actual image data—it simply sends the image data as "raw" data to the target, without any packet header attached to the packet. Because the target secondary processor initiates the data transfer request, it knows exactly how much data to receive. This enables the host to send data without a packet header, and the target to directly receive and store the data. In that aspect, the target requests data from the host as desired. The first data item it requests is the image header for a given image transfer. Once the target has processed the image header, it knows the location and size of each data segment in the image. The image header also specifies the destination address of the image in target memory. With this information, the target can request data from the host for each segment, and directly transfer the data to the appropriate location in target memory. The hardware controller for the inter-processor communication bus on the application processor may add its own low-level protocol headers, which would be processed and stripped by the modem processor. These low-level headers may be transparent to the software running on both processors.

Figure 3:
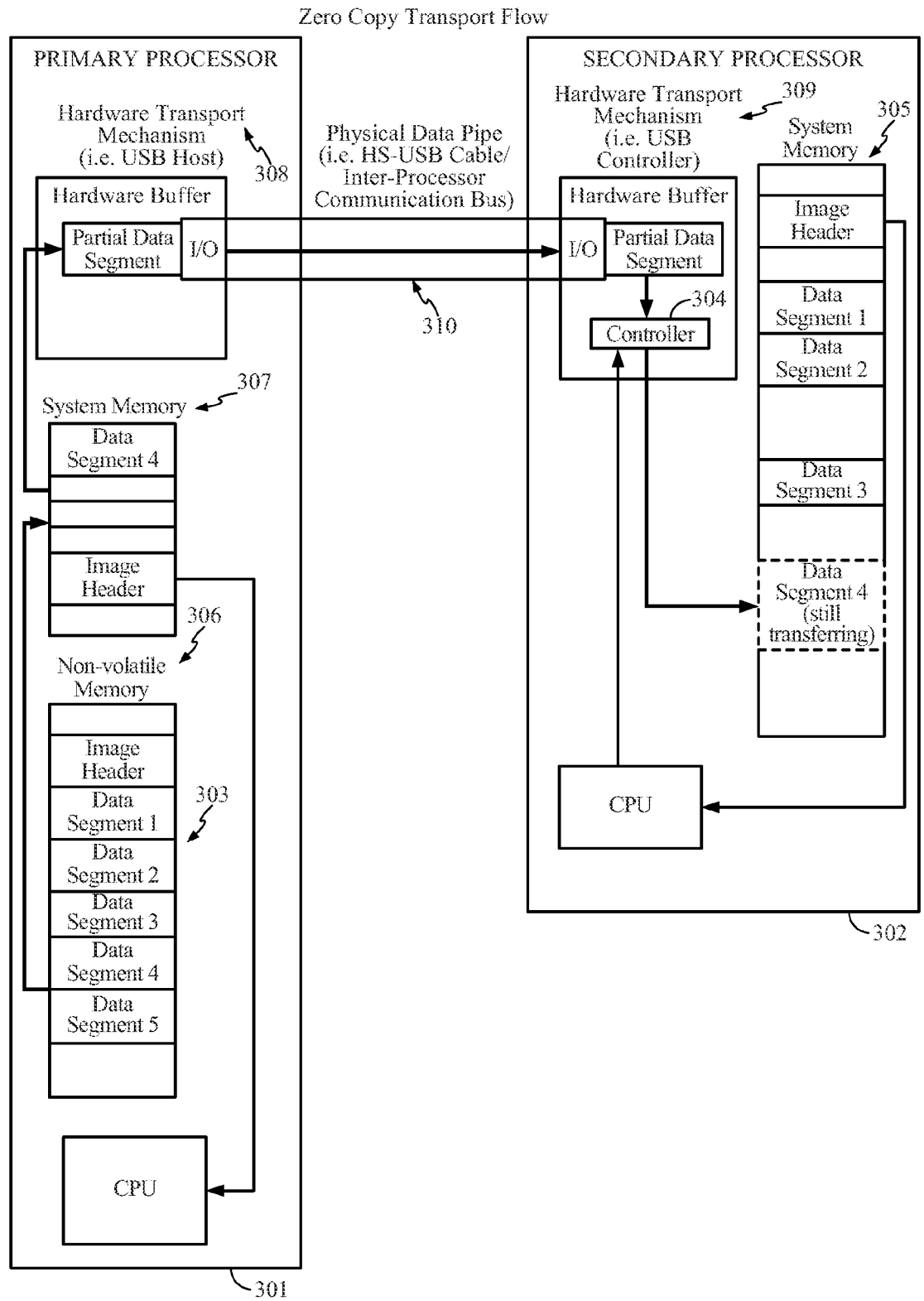
FIG. 3 is an illustration of an operational flow for an exemplary loading process for loading an executable image from a primary processor to a secondary processor according to one aspect of the present disclosure.

In one aspect of the present disclosure, the loading process is divided into two stages, as illustrated in the exemplary flow shown in FIG. 3. FIG. 3 shows a block diagram of a primary processor 301 (which may be the application processors 104 or 204 of FIG. 1 or 2 with their non-volatile memory 106 or 206) and a secondary processor 302 (which may be the modem processor 110 or 210 of FIG. 1 or 2 with their volatile memory 112 or 212). In FIG. 3, an exemplary software image for secondary processor 302 is stored to non-volatile memory of the primary processor 301. As shown in this example, the exemplary software image 303 is a multi-segment image that includes an image header portion and multiple data segments (shown as data segments 1-5 in this example). The primary processor 301 and secondary processor 302 may be located on different physical silicon chips (i.e. on a different chip package) or may be located on the same package.

In the first stage of the exemplary loading process of FIG. 3, the image header information is transferred to the secondary processor 302. The primary processor 301 retrieves the data image segments, beginning with the image header, from non-volatile memory of the primary processor 306. The primary processor 301 parses the image header to load individual image segments from non-volatile memory of the primary processor 306 to system memory of the primary processor 307. The image header includes information used to identify where the modem image executable data is to be eventually placed into the system memory of the secondary processor 305. The header information is used by the secondary processor 302 to program the scatter loader/direct memory access controller 304 receive address when receiving the actual executable data. Data segments are then sent from system memory 307 to the primary hardware transport mechanism 308. The segments are then sent from the hardware transport mechanism 308 of the primary processor 301 to a hardware transport mechanism 309 of the secondary processor 302 over an inter-processor communication bus 310 (e.g., a HS-USB cable.) The first segment transferred may be the image header, which contains information used by the secondary processor to locate the data segments into target locations in the system memory of the secondary processor 305. The image header may include information used to determine the target location information for the data.

In one aspect, the target locations are not predetermined, but rather are determined by software executing in the secondary processor as part of the scatter loading process. Information from the image header may be used to determine the target locations. In this aspect the secondary processor's boot loader first requests the image header from the primary processor (the primary processor CPU does not process the image header at all). The secondary processor knows how the data segments are laid out in the non-volatile memory by looking at the image header (besides the RAM address/size, the header also includes the relative locations in non-volatile memory with respect to the start of the image file for each segment). Subsequent requests for the data segments are driven by the secondary processor.

In another aspect the primary processor may indicate where to put the segments in the secondary processor's volatile memory by parsing the image header and then programming the secondary processor's controller to place the following data segments in the specified address dictated in the image header. This may involve extra hardware to allow this external control of the secondary processor's controller.

The image header generally includes a list of segment start addresses and sizes defining where each of the segments should be loaded in the secondary processor's system memory 305. Secondary processor 302 includes a hardware transport mechanism 309 (e.g., a USB controller) that includes a scatter loader controller 304. In the second stage of the loading process, the boot loader programs the inter-processor connection controller's engine to receive incoming data and scatter load it into the secondary processor's corresponding target memory regions 305 according to the header information received in the first stage.

In case of USB or HSIC bus, each segment of the image may be transferred as a single USB transfer on the inter-processor communication bus 310. Knowing the size of the segment and the destination address allows the software to program the scatter loader controller 304 of the secondary processor 302 for the transfer of the entire segment directly into the target memory location (within system memory 305) with minimum software intervention by the secondary processor 302. This may result in an increased performance on the USB/HSIC bus when the segments are significantly large (e.g., over 1 megabyte (MB)).

As shown in FIG. 3, the data segments are not necessarily placed into consecutive locations within the secondary processor's system memory 305. Instead, the segments may be spread out in different locations of the memory. The exemplary loading process of FIG. 3 enables a copy of the secondary processor's software (i.e., the image 303) to be sent from the primary processor 301 directly to the final destination of segment on the secondary processor's system memory 305. Further, there may be only a single data segment transferred.

The image header is loaded from the primary processor 301 to scatter loader controller 304 of secondary processor 302. That image header provides information as to where the data segments are to be located in the system memory 305. The scatter loader controller 304 accordingly transfers the image segments directly into their respective target locations in the secondary processor's system memory 305. That is, once the secondary processor's CPU processes the image header in its memory 305 and programs the scatter loader controller 304, the scatter loader controller 304 knows exactly where the image data segment(s) go within the secondary processor's system memory 305, and thus the hardware scatter loader controller 304 is then programmed accordingly to transfer the data segments directly into their target destinations. In the example of FIG. 3, the scatter loader controller 304 receives the data segment(s) and scatters them to different locations in the system memory 305. In one aspect, the executable software image is loaded into the system memory of the secondary processor without an entire executable software image being stored in the hardware buffer of the secondary processor. In one aspect the image data segment(s) to be transferred are located in non-contiguous locations in memory 306. In another aspect only a single image data segment is transferred. In another aspect a plurality of image data segments are transferred.

Accordingly, no extra memory copy operations occur in the secondary processor in the above aspect. Thus, conventional techniques employing a temporary buffer for the entire image, and the packet header handling, etc., are bypassed in favor of a more efficient direct loading process. Thus, the exemplary load process of FIG. 3 does not require the intermediate buffer operations traditionally required for loading a software image from a primary processor to a secondary processor. Instead of scatter loading from a temporary buffer holding the entire image, the exemplary load process of FIG. 3 allows for direct scatter loading of the image segments to their respective target destinations from the hardware to the system memory. Once the image header is processed, the executable image is directly scatter loaded into target memory, bypassing further CPU involvement.

Conventionally, when an external interface is involved (e.g., as is used in communicating image data from a primary processor to a secondary processor), some mechanism is required to transport that data so that both processors know what the actual data is and how to read the data. Often, the data to be transferred over an external interface is packetized with each packet including a header describing the data contained within the packet. For instance, in a transmission control protocol/internet protocol (TCP/IP) system where data is being transferred over a network, overhead associated with processing of packet headers arises.

In accordance with certain aspects of the present invention (e.g., as in the example of FIG. 3), the raw image data is transported. For instance, rather than transporting each segment of image data with a packet header, the exemplary load process of FIG. 3 determines the desired information about the data from the header associated with the entire image. Thus, the image header may be initially transferred, and all the processing for determining how to store the data to system memory 305 can occur before the transfer of the segments (based on the image header), and then the segments are transferred as raw data, rather than requiring processing of a packet-header for each segment as the segments are transferred. Thus, in the example of FIG. 3, the raw image data is being communicated from the primary processor to the secondary processor, and then handled by the hardware, which may strip off any USB packet headers, etc. In this exemplary aspect, there is no CPU processing done on the actual data segments, thereby improving efficiency of the load process.

When multiple images have to be loaded into the volatile memory of the same secondary processor, the above sequence of FIG. 3 may be repeated as many times as the number of images being transferred, in accordance with one aspect of the present disclosure. In certain aspects, within the primary processor 301, transfer from non-volatile memory to system memory may happen in parallel with sending data from the primary to secondary processor.

In one aspect, upon completion of each segment's transfer, the secondary processor 302 programs the scatter loader controller 304 to transfer the next segment and starts authentication of the segment that was just transferred. This enables the scatter loader controller 304 to transfer data while the secondary processor 302 performs the authentication. Authentication here refers generally to checking the integrity and authenticity of the received data. The details of the authentication mechanism are outside the scope of this disclosure, and any suitable authentication mechanism (including those well-known in the art) may be employed as may be desired in a given implementation. The above-mentioned parallelism can also apply to other post-transfer processing that may be desired to be performed by the secondary processor 302 in a given implementation.

As soon as the last segment of the last image is transferred and authenticated, the secondary processor 302 may continue with the boot process and execute transferred images.

Inter-Processor Communication Protocol

An inter-processor communication protocol is also disclosed. In one aspect of this disclosure, an exemplary protocol is provided that is driven from the secondary processor. For instance, the secondary processor may initiate whatever data transfers it desires from the primary processor. In other words, the secondary processor instructs the primary processor as to what data the secondary processor wants to receive. Accordingly, in certain aspects, the primary processor may have an executable software image (file) residing somewhere (e.g., on non-volatile memory with which the primary processor is coupled), and an identification may be associated with that file. The secondary processor (or "target") may send that identification to the primary processor and instruct the primary processor to send the corresponding data that is residing at a specified offset within the file. In response, the primary processor may send that raw data to the secondary processor. Thus, there is no packet header required in the returned data, but instead the returned data is sent directly from the primary processor to the secondary processor, which will upon receiving the data push it to the appropriate location in the secondary processor's system memory.

The following describes further details for an exemplary embodiment of an inter-processor communication protocol. While specific details for the below exemplary embodiments are described, it should be understood that the concepts described herein for an inter-processor communication protocol are not limited to the specific details described below.

Introduction

This following description provides information on an exemplary inter-processor communication protocol, which may be used to transfer data to/from memory. The description includes information about the protocol's packet structures, packet flows, and exemplary uses. The specific implementation of the exemplary protocol described below does not provide a mechanism for authenticating/validating the data sent using the protocol. Such mechanisms are beyond the scope of the exemplary protocol description provided herein, but any suitable authenticating and/or validating mechanism may be implemented in conjunction with this protocol as data is being transferred, as may be desired for a given application.

Overview of Exemplary Protocol

An exemplary aspect of an inter-processor communication protocol described below is designed primarily for transferring software images from a host (e.g., "primary processor") to a target (e.g., "secondary processor"). The protocol provides a simple mechanism for requesting data to be transferred over any physical link.

This exemplary aspect of the protocol supports two basic packet types: command packets, and data packets. Command packets are sent between the host and target to set up transfers of data packets.

Target-driven protocol. This exemplary aspect of the protocol reduces data transfer overhead by reducing the number of command packets sent between the host and target. This is accomplished by making the protocol target-driven, and by having the target perform data processing. The host waits for a data transfer request, which contains the following information:

The data image to transfer
The offset into the image to start reading from
The data transfer length The host does not process or extract any information from the actual image data—it sends the image data as "raw" data to the target, without any packet header attached to the packet. Because the target initiates the data transfer request, it knows exactly how much data to receive. This enables the host to send data without a packet header, and the target to directly receive and store the data.

The target may request data from the host as desired. The first data item it requests in this exemplary aspect of the protocol is the image header for a given software image transfer. Once the target has processed the image header, it knows the location and size of each data segment in the image. The image header also specifies the destination address of the image in target memory. With this information, the target can request data from the host for each segment, and directly transfer the data to the appropriate location in target memory.

Packet Processing.

This exemplary aspect of the protocol reduces packet processing by using the physical transport layer to provide reliable transfer of data. No framing, HDLC (High-level Data Link Control) encoding, or CRC (Cyclic Redundancy Check) is applied to the packets at the protocol level.

Each command packet type has a defined structure which may contain a command ID and packet length. Using this information, the length of each command packet may be validated by comparing the length of the command packet received to either of two values:

The expected packet length for the given command ID
The length field contained in the packet itself This exemplary aspect of the protocol may readily be extended to support command packet validation by adding a CRC field to the end of each packet. Data packets may also be validated for data integrity using various authentication methods; however, this is beyond the scope of the present description of this exemplary aspect of the protocol.

Acknowledged Communication.

According to this exemplary aspect of the protocol, communication between host and target are acknowledged. Command packets sent from the target to the host are acknowledged with a command or data packet sent from the host back to the target. Similarly, command packets sent from the host to the target are acknowledged with a command or data packet from the target to the host.

Although the link between host and target is expected to be reliable, if an error occurs during the transmission of a command packet from the host to the target, and as a result the target receives an erroneous packet, then the target will send the host an error response.

Timer mechanisms may be implemented on both host and target to support the retransmission of packets in case of transmission failures. However, the implementation of such mechanisms is outside the scope of the present description of this exemplary aspect of the protocol—it specifies only what happens when unexpected or erroneous packets are received on the target side.

Extensibility.

This exemplary aspect of the protocol defines a fixed set of command structures and packet flows. However, it may readily be extended to support additional command structures and state transitions (as described further below).

Interface

Overview.

This exemplary aspect of the protocol defines two types of packets:

Command packets

Data packets

The structure of these packets according to this exemplary aspect of the protocol is shown below:

| Command Packet | | | |
|---|---|---|---|
| COMMAND ID | PACKET LENGTH | OPTIONAL FIELD | OPTIONAL FIELD |

| Data Packet |
|---|
| RAW DATA (arbitrary number of bytes) |

Command packets contain a command ID and packet length. Depending on the command, the packet may contain additional command-specific fields. The command packet structure enables future revisions of the protocol to readily add fields to the end of a packet type, while preserving compatibility with the packet structure of previous protocol versions.

Commands.

Commands used in command packets of this exemplary aspect of the protocol are listed in Table 1 below.

TABLE 1

Commands

| ID Value (HEX) | Command | Sent by | Description |
|---|---|---|---|
| 00 | — | — | Invalid |
| 01 | Hello | Target | Initialize connection and protocol |
| 02 | Hello Response | Host | Acknowledge connection and protocol sent by target |
| 03 | Read Data | Target | Read specified number of bytes from host for a given image |
| 04 | End of Image Transfer | Target | Indicate to host that a single image transfer is complete. Also used to indicate a target failure during an image transfer |
| 05 | Done | Host | Acknowledgement from host that a single image transfer is complete |
| 06 | Done Response | Target | Indicate to host: That target is exiting protocol Whether or not target expects to re-enter protocol to transfer another image |
| 07 | Reset | Host | Instruct target to perform a reset |
| 08 | Reset Response | Target | Indicate to host that target is about to reset |

TABLE 1-continued

Commands

| ID Value (HEX) | Command | Sent by | Description |
|---|---|---|---|
| 09 | Host Error | Host | Indicate to target that host encountered an error during an image transfer request or memory dump |
| 0A | Host Error Response | Target | Acknowledgement to host that target has received host status. Also used to indicate to host what target is expecting to do next |
| 0B | Memory Dump | Target | Indicate to host that target has entered a debug mode where it is ready to transfer its system memory contents |
| 0C | Memory Read | Host | Read specified number of bytes from target's system memory starting from a specified address. Also used to indicate when host has completed memory dump |
| All Others | — | — | Invalid |

Hello Packet.

When the target sends a Hello packet, it uses the format shown in Table 2 below.

TABLE 2

Hello packet

| Field | Length (bytes) | Description | Value release 1.0 |
|---|---|---|---|
| Command | 4 | Command identifier code | Target sets this field to 0x00000001 |
| Length | 4 | Length of packet (in bytes) | Target sets this field to 0x00000014 |
| Version Number | 4 | Version number of this protocol implementation | Target sets this field to indicate the current version of the protocol that it is running. The value is 0x00000001. |
| Version Supported | 4 | Lowest compatible version | Target sets this field to indicate the lowest version of the protocol that it supports. The value is 0x00000001. |
| Command Packet Length | 4 | Maximum command packet length (in bytes) the protocol supports | Target sets this based on the buffer used in protocol implementation |

The Hello packet is the first packet that the target sends to the host. If the host receives any other packet, it will send a reset command to the target.

When the host receives a valid Hello packet, it first verifies that the protocol running on the target is compatible with the protocol running on the host. If the protocols are mismatched, the host will send a reset command to the target.

The target also sends the maximum length of the command packet that it support—the host uses this information to avoid sending more bytes than the target can support in the receiving command buffer.

Hello Response Packet.

When the host sends a Hello Response packet, it uses the format shown in Table 3 below.

TABLE 3

Hello Response packet

| Field | Length (bytes) | Description | Value release 1.0 |
|---|---|---|---|
| Command | 4 | Command identifier code | Host sets this field to 0x00000002 |
| Length | 4 | Length of packet (in bytes) | Host sets this field to 0x00000014 |
| Version Number | 4 | Version number of this protocol implementation | Host sets this field to indicate maximum version of the protocol that the host supports. The value is 0x00000001. |
| Version Supported | 4 | Lowest compatible version | Host sets this field to indicate lowest version of the protocol that it supports. The value is 0x00000001. |
| Status | 4 | Success or error code | Host sets this field based on the Hello packet received; if target protocol matches host and no other errors, a success value is sent |

Once the host validates the protocol running on the target, it sends the following information to the target:
  The protocol version that it is running
  The minimum protocol version it supports The host sets the packet Status field to "success" if no errors occur on the host side. Once the target receives this packet, it can proceed with data transfer requests.

Read Data Packet.

When the target sends a Read Data packet, it uses the format shown in Table 4 below.

TABLE 4

Read Data packet

| Field | Length (bytes) | Description | Value release 1.0 |
|---|---|---|---|
| Command | 4 | Command identifier code | Target sets this field to 0x00000003 |
| Length | 4 | Length of packet (in bytes) | Target sets this field to 0x00000014 |
| Image ID | 4 | ID of the image to be transferred | Target sets this field to correspond to the image it wants the host to transfer |
| Data Offset | 4 | Offset into the image file to start transferring data from | Target sets this field to the offset (in bytes) into the image file that it wants to retrieve data from |
| Data Length | 4 | Number of bytes the target wants to transfer from the image | Target sets this field to the number of bytes it wants to read from the image file |

To initiate an image transfer, the target fills this packet with the image ID corresponding to the image it wants to receive. The target also sends the offset into the image file, and the length of the data (in bytes) it wants to read from the image.

This packet serves as a generic data transfer packet when image data is to be transferred from host to target. The Read Data packet allows flexibility in the way the image is transferred from host to target. Because the target controls what data gets transferred, it can determine what parts of the image get transferred and in what order.

The host may not know anything about the structure of the image; it simply opens the file and start transferring the data to the target based on the parameters specified in the packet. This gives the target control over how the images are transferred and processed.

When the host receives this packet, the host is expected to respond with a data packet. The data packet must contain just the image data, and must be of the length specified in the Read Data packet.

Several error conditions may occur if the host receives any of the following in a Read Data packet:
  Invalid or unsupported image ID
  Invalid data offset
  Invalid data length If any of the above fields are invalid, or if any other error occurs on the host, the host may send a data packet with a length that does not match what the target was expecting. The resulting error may cause the target to send an End of Image Transfer packet with an error code in the Status field (see exemplary packet structure in Table 5). This transaction enables both the target and host to enter an error handling state.

This exemplary aspect of the protocol may be implemented by a state machine where any error that occurs results in the host sending a Reset packet (see further description of "Exemplary Protocol Implementation" below). Certain implementations of the protocol may provide implementations where the Host Error and Host Error Response packets may be used to handle certain errors.

End of Image Transfer Packet.

When the target sends an End of Image Transfer packet, it uses the format shown in Table 5 below.

TABLE 5

End of Image Transfer packet

| Field | Length (bytes) | Description | Value release 1.0 |
|---|---|---|---|
| Command | 4 | Command identifier code | Target sets this field to 0x00000004 |
| Length | 4 | Length of packet (in bytes) | Target sets this field to 0x00000010 |
| Image ID | 4 | ID of an image that was being transferred | Target sets this field to correspond to the image it was transferring or processing. |
| Status | 4 | Success or error code | Target sets this field based on whether an image was transferred successfully or not. |

If an image transfer is successfully completed, the target sends the host an End of Image Transfer packet with a "success" status. At this point, the target waits for the host to send a Done packet. If any error occurs during the transfer or processing of the image data, the status is set to the corresponding error code, and the target waits for a different command packet.

This exemplary aspect of the protocol may be implemented by a state machine where the target assumes the host is always going to send a Reset packet after an error is sent in the End of Image Transfer packet (see further description of "Exemplary Protocol Implementation" below). The protocol allows other command packets to be sent from the host to the target in response to the End of Image Transfer error packet.

Done Packet.

When the host sends a Done packet, it uses the format shown in Table 6 below.

TABLE 6

Done packet

| Field | Length (bytes) | Description | Value release 1.0 |
|---|---|---|---|
| Command | 4 | Command identifier code | Host sets this field to 0x00000005 |
| Length | 4 | Length of packet (in bytes) | Host sets this field to 0x00000008 |

If the host receives an End of Image Transfer packet with a "success" status, the host proceeds to send a Done packet to indicate to the target that it may exit the protocol and continue executing. If the target wishes to transfer another image from the host, it re-initiates the protocol by starting with another Hello packet.

Done Response Packet.

When the target sends a Done Response packet, it uses the format shown in Table 7 below.

TABLE 7

Done Response packet

| Field | Length (bytes) | Description | Value release 1.0 |
|---|---|---|---|
| Command | 4 | Command identifier code | Target sets this field to 0x00000006 |
| Length | 4 | Length of packet (in bytes) | Target sets this field to 0x0000000C |
| Image Transfer Status | 4 | Indicates whether target is expecting to receive another image or not | Target sets this field to correspond to whether all image transfers are complete, or an image transfer is pending |

If the target receives a Done packet, it responds with a Done Response packet containing the image transfer status:

If all the images have been transferred, the target sends a "complete" status to enable the host to exit the protocol.

If all the images have not been transferred, the target sends a "pending" status. The target will assume the host will continue to execute the protocol and wait for another Hello packet to arrive.

Reset packet. When the host sends a Reset packet, it uses the format shown in Table 8 below.

TABLE 8

Reset packet

| Field | Length (bytes) | Description | Value release 1.0 |
|---|---|---|---|
| Command | 4 | Command identifier code | Host sets this field to 0x00000007 |
| Length | 4 | Length of packet (in bytes) | Host sets this field to 0x00000008 |

The host sends a Reset packet when it wants to reset the target. The target services a Reset request if it is in a state where reset requests are valid. If the target receives an invalid reset request, the target will send an error in an End of Image Transfer packet.

Reset Response Packet.

When the target sends a Reset Response packet, it uses the format shown in Table 9 below.

TABLE 9

Reset Response packet

| Field | Length (bytes) | Description | Value release 1.0 |
|---|---|---|---|
| Command | 4 | Command identifier code | Target sets this field to 0x00000008 |
| Length | 4 | Length of packet (in bytes) | Target sets this field to 0x00000008 |

If the target receives a valid reset request, it sends a Reset Response packet just before it resets. The purpose of this response is for the target to acknowledge to the host that the target received the reset request. If the host does not receive the Reset Response command from the target (or receives a different command), it may attempt to resend the request.

Host Error Packet.

Aspects of the protocol may use this packet to allow the host to send an error code to the target if any error occurs on the host.

Host Error Response Packet.

Aspects of the protocol may use this packet to the target to acknowledge the Host Error packet. This packet may provide the host with information on how the target is handling the host error.

Memory Dump Packet.

Aspects of the protocol may use this packet to initiate a memory dump of the target's system memory. This packet may indicate to the host that the target is ready to receive Memory Read requests to transfer system memory contents.

Memory Read Packet.

Aspects of the protocol may use this packet to allow the host to issue memory read requests from the target. This packet may contain the physical address and size of the memory transfer. The target may respond with a data packet that contains just the memory contents that the host requested. If any error occurs on the target side, the target can send a data packet with a length that does not match the requested size of the memory transfer. This will cause an error on the host side, allowing the host to appropriately respond.

Status Codes.

Table 10 below lists the status and error codes supported by this exemplary aspect of the protocol.

TABLE 10

Status and error codes

| Status/Error Code (hexadecimal) | Minimum protocol version | Description |
|---|---|---|
| 0x00 | 1.0 | Success |
| 0x01 | 1.0 | Invalid command received in current state |
| 0x02 | 1.0 | Protocol mismatch between host and target |
| 0x03 | 1.0 | Invalid target protocol version |
| 0x04 | 1.0 | Invalid host protocol version |
| 0x05 | 1.0 | Invalid packet size received |
| 0x06 | 1.0 | Unexpected image ID received |
| 0x07 | 1.0 | Invalid image header size received |
| 0x08 | 1.0 | Invalid image data size received |
| 0x09 | 1.0 | Invalid image type received |
| 0x0A | 1.0 | Invalid transmission length |
| 0x0B | 1.0 | Invalid reception length |
| 0x0C | 1.0 | General transmission or reception error |
| 0x0D | 1.0 | Error while transmitting READ_DATA packet |
| 0x0E | 1.0 | Cannot receive specified number of program headers |

TABLE 10-continued

Status and error codes

| Status/Error Code (hexadecimal) | Minimum protocol version | Description |
|---|---|---|
| 0x0F | 1.0 | Invalid data length received for program headers |
| 0x10 | 1.0 | Multiple shared segments found in ELF image |
| 0x11 | 1.0 | Uninitialized program header location |
| 0x12 | 1.0 | Invalid destination address |
| 0x13 | 1.0 | Invalid data size received in image header |
| 0x14 | 1.0 | Invalid ELF header received |
| 0x15 | 1.0 | Unknown host error received in HELLO_RESP |
| All others | — | Invalid |

Operation

Overview. The description below covers the following topics:

How this exemplary aspect of the protocol can be used to transfer an image from host to target An example state machine which implements the protocol and illustrates how to deal with errors that occur during the image transfer How a system can use the protocol to parallelize the image transfer requests Successful Image Transfer Sequence.

Figure 4:
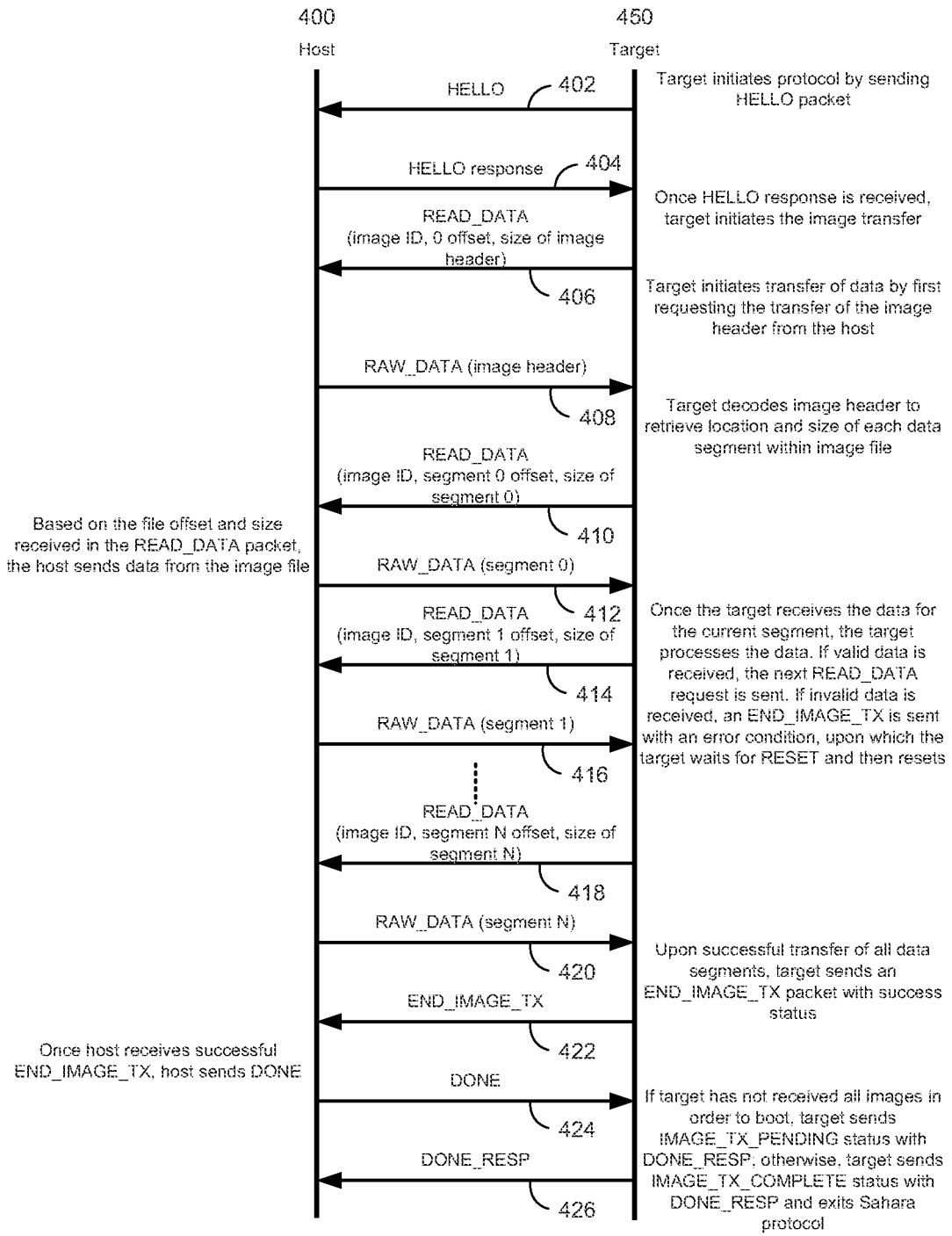
FIG. 4 is an illustration of packet flow between two processors according to one aspect of the present disclosure.

FIG. 4 shows the packet flow for a successful image transfer sequence. The packet flow sequence is described below. At time 402 a Hello packet is sent from the target 450 to the host 400 to initiate the protocol. Upon receiving the Hello packet and validating the protocol version running on the target 450, at time 404 the host 400 sends a Hello Response packet with a "success" status.

Once the target 450 receives the Hello Response, at time 406 the target 450 initiates image transfer requests by sending Read Data packets. Each Read Data packet specifies which image the target 450 wishes to receive and what part of the image to transfer. During normal operation, at time 406 the target 450 first requests image header information which specifies the rest of the image (i.e. image size and where in system memory the image data is to be transferred). When sending this request for the image header—which is sent as a Read Data request—the target 450 knows the format of the image to be transferred. The host 400 may not know anything about the image formats, allowing the host 400 to simply read and transfer data from the image as requested by the target 450. Following the request, at time 408 the image header is sent from the host 400 to the target 450.

If the image is a standalone binary image without any data segmentation (i.e. the data is entirely contiguous when stored as well as transferred to the target 450 system memory), the target 450 may request that the entire image data be sent in one transfer. If the image data is segmented and requires scattering of the data segments to non-contiguous system memory locations, the target 450 may issue multiple Read Data requests (for example at times 406, 410, 414, and 418) to enable each data segment to be transferred directly to the respective destination address (for example at times 412, 416, and 420). This scattering information resides in the image header, and is parsed by the target 450 before issuing the Read Data requests.

Upon receiving a Read Data request, the host 400 parses the image ID, data offset, and data length in order to transfer data from the corresponding image file. The host 400 sends the data requested without any packet header. The target 450 directly transfers this data to the destination address without any software processing or temporary buffering of the data in system memory. This is made possible by transferring the image header to the target 450, and by setting the receive buffer for the data to be the destination address in system memory.

Once the target 450 successfully receives all segments for an image, at time 422 the target 450 sends an End of Image Transfer (END_IMAGE_TX) packet with the image ID of the corresponding image, and a "success" status. This enables the host 400 to stop reading and close the image file. Upon receiving a successful End of Image Transfer, at time 424 the host 400 sends a Done packet to allow the target 450 to exit the protocol. Once the target 450 receives the Done packet, at time 426 the target 450 sends a Done Response packet to the host 400. Within this packet, the target 450 indicates whether it expects another image to be transferred. If another image is to be transferred to the target 450, the host 400 can continue to run the protocol.

Exemplary Protocol Implementation.

This exemplary aspect of the protocol may be implemented using state machines for both the target and host. Examples of these state machines are shown in FIGS. 5, 6, and 7.

Target State Machine.

Figure 5:
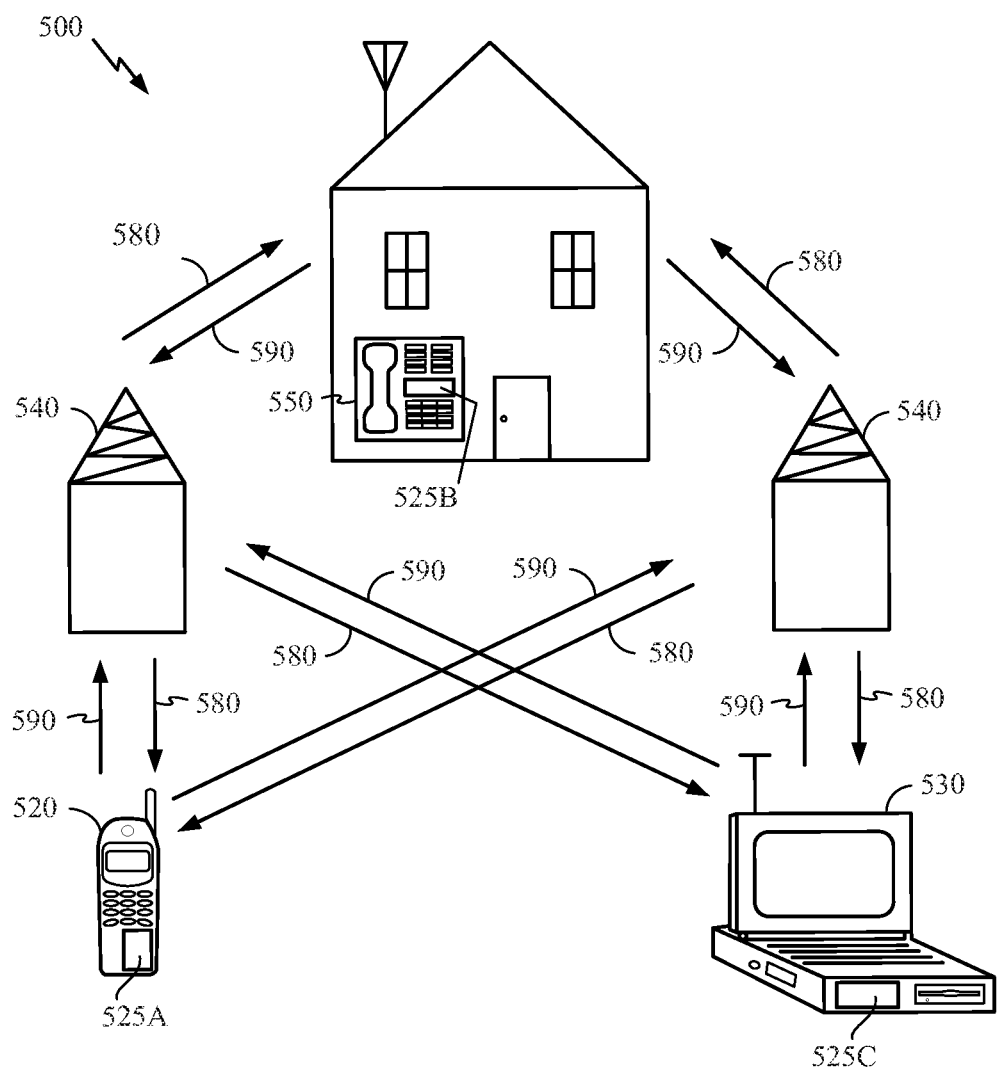
FIG. 5 is a block diagram showing an exemplary wireless communication system in which an aspect of the disclosure may be advantageously employed.
Figure 6:
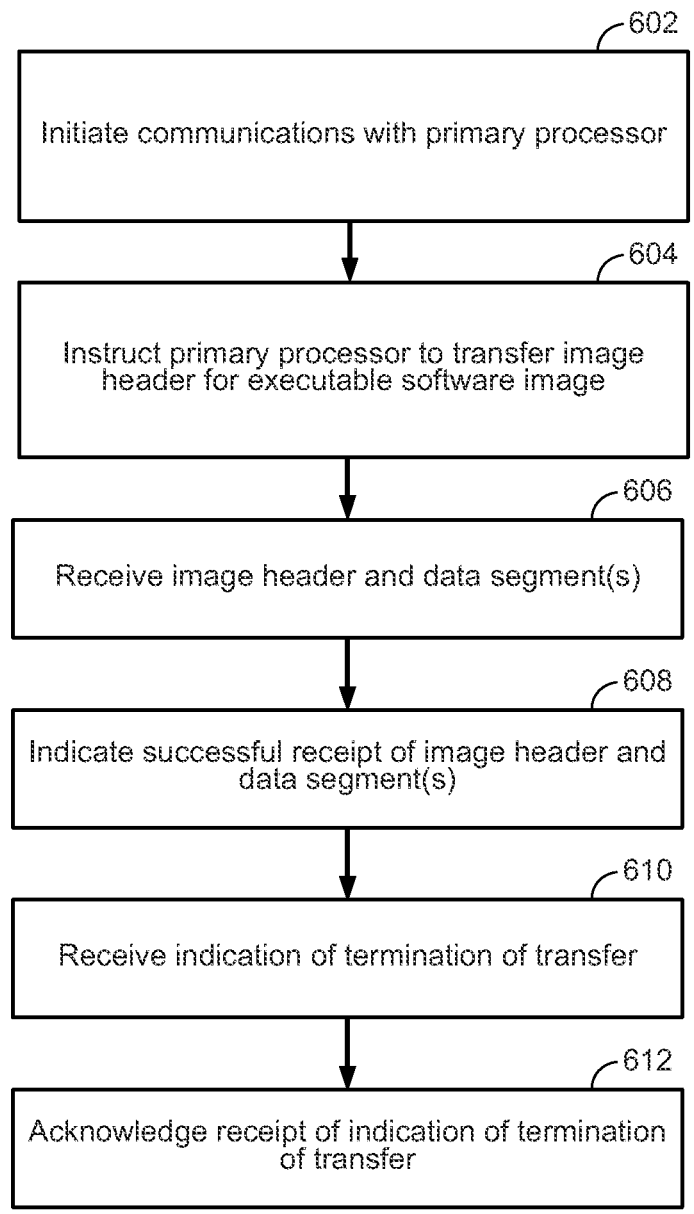
FIG. 6 is a block diagram illustrating communications regarding transfer of an executable software image according to one aspect of the present disclosure.
Figure 7:
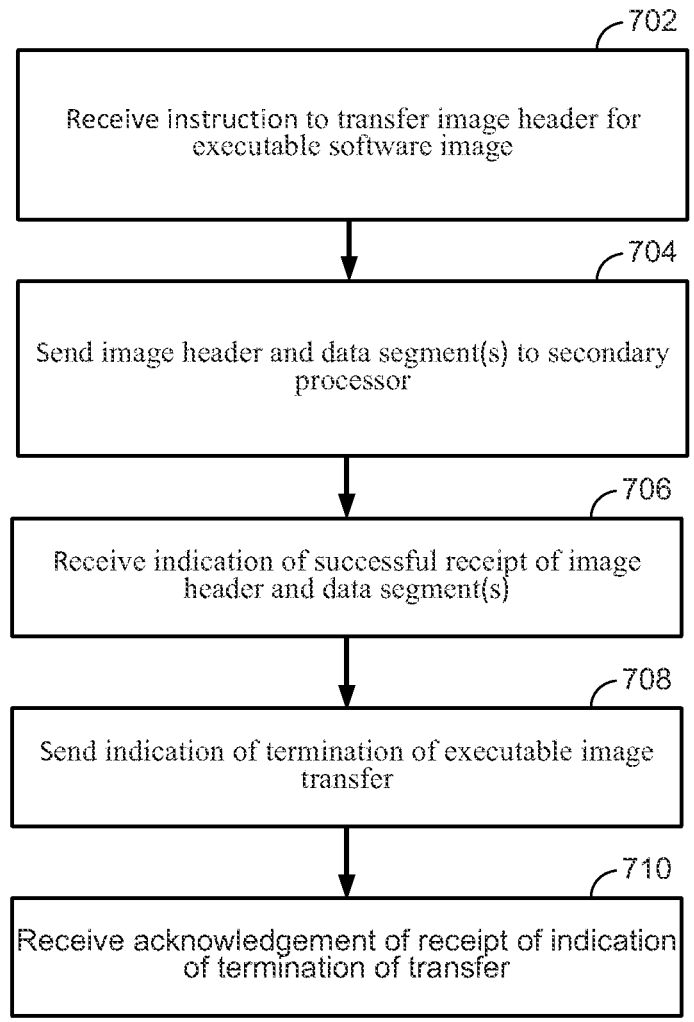
FIG. 7 is a block diagram illustrating communications regarding transfer of an executable software image according to one aspect of the present disclosure.

FIGS. 5 and 6 show a state machine which implements the target side of the packet flow shown in FIG. 4. This illustrates how the actual image data can be transferred for two types of software image formats:

Standalone binary

Executable and Linkable Format (ELF)

The standalone binary format uses a simple image header which describes the size and destination address for the image data. ELF format allows data to be segmented and scattered into non-contiguous sections of system memory.

The following list describes each state in the state machine of FIGS. 5 and 6, and how the target reacts to incoming packets when in these states:

WAIT_HELLO_RESP: After the target sends a Hello packet, the target waits until a Hello Response packet is received from the host. If an invalid packet or erroneous packet is received, the target sends an End of Image Transfer packet to the host with the corresponding error code. If a Reset packet is received, the target sends a Reset Response and then resets.

DATA_BINARY: The target has received the standalone binary image header. If anything is wrong with the image header, the target sends an End of Image Transfer packet with the corresponding error code. If a valid image header is received, the target sends a single Read Data request to transfer the image data. Once the image data is received, if the data is valid, the target sends an End of Image Transfer with "success" status. If any error occurs during the image transfer, the target sends an End of Image Transfer with the corresponding error code.

DATA_ELF_HDR: The target has received the ELF header for an ELF image. If anything is wrong with the ELF header, the target sends an End of Image Transfer packet with the corresponding error code. If a valid ELF header is received, the target sends a single Read Data request to the program headers from the ELF image. The size and location of the program headers in the ELF image are embedded in the ELF header.

DATA_ELF_PROG_HDR: The target has received the ELF program headers for an ELF image. If anything is wrong with the program headers, the target sends an End of Image Transfer packet with the corresponding error code. If valid program headers are received, the target processes them to determine the location of a hash table segment. A hash table can be used to validate the integrity of each data segment by applying a hash function to each data segment and storing the hash value in the hash table. Upon loading each ELF data segment, the hash function can be applied to each segment and the hash value compared to the one that was stored in the hash table. Specific hash algorithms and authentication routines are not described here, as they are outside the scope of this protocol.

DATA_ELF_SEGMENTS: Once the location and size of each data segment is determined from the program headers, the target repeatedly sends Read Data requests until each data segment is transferred. Once all ELF segments are received, the target sends an End of Image Transfer with "success" status.

WAIT_DONE: Once a single image transfer is complete, the target waits for a Done packet to be sent. If an invalid or any other packet is received, the target sends an End of Image Transfer packet with the corresponding error code. If a valid Done packet is received, the target sends a Done Response to the host, with the Image Transfer Status field set to "complete" or "pending" based on whether another image is to be transferred or not.

WAIT_RESET: Any time an error occurs on the target, the target expects the host to send a Reset command. If the target receives a Reset command, it sends a Reset Response to the host and then resets. If an invalid or any other command is received, the target sends an End of Image Transfer packet with the corresponding error code.

Host Side State Machine.

A host side state machine may be employed to implement the host side of the packet flow shown in FIG. 4. The following list describes the operation of that state machine and how the host reacts to incoming packets when in these states:

WAIT_HELLO: The host waits for the target to initiate the protocol. Once the Hello is received and the protocol version validated, the host sends a Hello Response with "success" status. If the host receives an invalid packet (or any other packet), it sends a Reset packet to the target. The host will also send a Reset packet if the target protocol version is not compatible with the host.

WAIT_COMMAND: If the host receives a Read Data packet, the host reads and transfers data from the corresponding image in a data packet. If the host receives an End of Image Transfer packet with "success" status, it sends a Done packet. If the host receives an invalid command (or any other command), it sends a Reset packet. The host will also send a Reset packet if it receives an End of Image Transfer packet with an error code.

WAIT_DONE_RESP: The host waits for a Done Response. If all images have not been transferred, the host waits for another Hello packet. If all images have been transferred, the host exits the protocol. If the host receives an invalid command (or any other command), it sends a Reset packet.

WAIT_RESET_RESP: After the host sends a Reset packet, it waits for the target to send a Reset Response. If the host receives a Reset Response, it exits the protocol. If the host receives an invalid command (or any other command), it sends another Reset packet.

Error Handling.

The above description following "Exemplary Protocol Implementation" describes how errors may be reported and handled using this exemplary aspect of the protocol. Timeouts and retransmission of packets are often implemented to handle possible transmission or reception errors. Techniques for implementing such strategies may be employed, but further description of those specific techniques are outside the scope of this description of this exemplary aspect of the protocol.

Parallel Image Transfers.

The following describes how multiple images may be transferred in parallel through the use of multi-threaded environments.

Single Host, Multiple Targets.

If the host can distinguish between targets at the hardware transport layer, and can route the protocol's packets to the corresponding target, the host can execute a state machine for each target on a separate thread:

Each target runs its own state machine to transfer the images it wishes to transfer The host runs a thread manager to send/receive the protocol's packets and route them to corresponding state machine Because the Read Data requests specify the image ID, data offset, and data length, the host reads from the corresponding image file and sends the data to the requesting target.

Multiple Hosts, Single Target.

If a target desires to transfer images from multiple hosts, the connections from each host may be encapsulated in the hardware transport layer. On entering the protocol, the target may specify which hardware it wishes to use to transfer the given image. The target may choose to enter and exit the protocol for each image, allowing it to select the hardware transport layer to use for each image (effectively abstracting the host connections in the corresponding software driver by using dispatch tables). Each host may then run separate state machines.

Single Host, Single Target, Parallel Images.

If a target desires to transfer images in parallel from the host, a threaded environment may be used on the target (similar to the threaded environment described above). The difference is that the threaded environment is not engaged on the host. The target manages the routing of packets to the state machine for each image.

FIG. 5 is a block diagram showing an exemplary wireless communication system 500 in which an aspect of the disclosure may be advantageously employed. For purposes of illustration, FIG. 5 shows three remote units 520, 530, and 550 and two base stations 540. It will be recognized that wireless communication systems may have many more remote units and base stations. Remote units 520, 530, and 550 include IC devices 525A, 525C and 525B, that include the disclosed multi-processor device. It will be recognized that other devices may also include the disclosed multi-processor device, such as the base stations, switching devices, and network equipment. FIG. 5 shows forward link signals 580 from the base station 540 to the remote units 520, 530, and 550 and reverse link signals 590 from the remote units 520, 530, and 550 to base stations 540.

In FIG. 5, remote unit 520 is shown as a mobile telephone, remote unit 530 is shown as a portable computer, and remote unit 550 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 5 illustrates remote units according to the teachings of the disclosure, the disclosure is not limited to these exemplary illustrated units.

Aspects of the disclosure may be suitably employed in any device which includes a multi-processor system.

As shown in FIG. 6 a secondary processor in a multi-processor system may execute a method for transfer of an executable software image. The secondary processor may initiate communications with a primary processor as shown in block 602. The secondary processor may instruct the primary processor to transfer an image header for an executable software image as shown in block 604. The executable software image includes the image header and at least one data segment. The secondary processor may receive the image header and at least one data segment as shown in block 606. The secondary processor may indicate successful receipt of the image header and at least one data segment as shown in block 608. The secondary processor may receive an indication of termination of the executable software image transfer as shown in block 610. The secondary processor may acknowledge receipt of the indication of termination of transfer as shown in block 612.

A multi-processor device may comprise means for initiating, means for instructing, means for receiving, means for indicating, and means for acknowledging. The means may include an application processor 104, 204, secondary processor 302, inter-processor communication bus 134, 234, a hardware transport mechanism, 309, controller 304, and/or physical data pipe 310. In another aspect, the aforementioned means may be a module or any apparatus configured to perform the functions recited by the aforementioned means.

As shown in FIG. 7 a primary processor in a multi-processor system may receive an instruction to transfer an image header for an executable software image, said executable software image comprising said image header and at least one data segment, as shown in block 702. The primary processor may send the image header and at least one data segment to a secondary processor, as shown in block 704. The primary processor may receive an indication from the secondary processor of successful receipt of the image header and at least one data segment, as shown in block 706. The primary processor may send an indication of termination of the executable image transfer, as shown in block 708. The primary processor may receive an acknowledgment from the secondary processor of receipt of the indication of termination of transfer, as shown in block 710.

A multi-processor device may comprise means for receiving and means for sending. The means may include a modem processor 110, 210, primary processor 301, inter-processor communication bus 134, 234, a hardware transport mechanism, 308, system memory 307, and/or physical data pipe 310. In another aspect, the aforementioned means may be a module or any apparatus configured to perform the functions recited by the aforementioned means.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although specific circuitry has been set forth, it will be appreciated by those skilled in the art that not all of the disclosed circuitry is required to practice the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A communication method between two processors in a multi-processor system, the method comprising:
   initiating, by a secondary processor, communications with a primary processor;
   instructing, by the secondary processor, the primary processor to transfer an image header for an executable software image, said executable software image comprising said image header and at least one data segment;
   receiving, by the secondary processor, the image header and at least one data segment from the primary processor;

indicating, by the secondary processor, to the primary processor, successful receipt of the image header and at least one data segment;

directly storing, by the secondary processor, the at least one data segment of the executable software image within a target location of a system memory of the secondary processor, the target location allocated by the secondary processor according to the image header; and acknowledging, by the secondary processor, to the primary processor receipt of an indication of termination of transfer.

2. The method of claim 1 in which the image header comprises an image size and location in memory in which image data is located.

3. The method of claim 1 further comprising sending, by the secondary processor, a transfer request to the primary processor for each of the at least one data segment.

4. The method of claim 1 in which the instructing comprises sending, by the secondary processor, the primary processor a message comprising an image identification, data offset, and data length.

5. The method of claim 1 further comprising setting, by the secondary processor, a receive buffer for an incoming data segment to be a destination address in the system memory of the secondary processor.

6. A multi-processor device comprising:
means for initiating, by a secondary processor, communications with a primary processor;
means for instructing, by the secondary processor, the primary processor to transfer an image header for an executable software image, said executable software image comprising said image header and at least one data segment;
means for receiving, by the secondary processor, the image header and at least one data segment from the primary processor;
means for indicating, by the secondary processor, to the primary processor, successful receipt of the image header and at least one data segment;
means for directly storing, by the secondary processor, the at least one data segment of the executable software image within a target location of a system memory of the secondary processor, the target location allocated by the secondary processor according to the image header; and
means for acknowledging, by the secondary processor, to the primary processor receipt of an indication of termination of transfer.

7. The multi-processor device of claim 6 in which the image header comprises an image size and location in memory in which image data is located.

8. The multi-processor device of claim 6 further comprising means for sending, by the secondary processor, a transfer request to the primary processor for each of the at least one data segment.

9. The multi-processor device of claim 6 in which the means for instructing comprises means for sending, by the secondary processor, the primary processor a message comprising an image identification, data offset, and data length.

10. The multi-processor device of claim 6 further comprising means for setting, by the secondary processor, a receive buffer for an incoming data segment to be a destination address in the system memory of the secondary processor.

11. A computer program product comprising:
a non-transitory computer-readable medium having non-transitory program code recorded thereon, the non-transitory program code comprising:
program code to initiate, by a secondary processor, communications with a primary processor;
program code to instruct, by the secondary processor, the primary processor to transfer an image header for an executable software image, said executable software image comprising said image header and at least one data segment;
program code to receive, by the secondary processor, the image header and at least one data segment from the primary processor;
program code to indicate, by the secondary processor, to the primary processor, successful receipt of the image header and at least one data segment;
program code to directly store, by the secondary processor, the at least one data segment of the executable software image within a system memory of the secondary processor, the target location allocated by the secondary processor according to the image header; and
program code to acknowledge, by the secondary processor, to the primary processor receipt of an indication of termination of transfer.

12. The computer program product of claim 11 in which the image header comprises an image size and location in memory in which image data is located.

13. The computer program product of claim 11 in which the non-transitory program code further comprises program code to send, by the secondary processor, a transfer request to the primary processor for each of the at least one data segment.

14. The computer program product of claim 11 in which the program code to instruct comprises program code to send, by the secondary processor, the primary processor a message comprising an image identification, data offset, and data length.

15. The computer program product of claim 11 in which the non-transitory program code further comprises program code to set, by the secondary processor, a receive buffer for an incoming data segment to be a destination address in the system memory of the secondary processor.

16. A communication method between two processors in a multi-processor system, the method comprising:
receiving, by a primary processor, an instruction to transfer an image header for an executable software image, said executable software image comprising said image header and at least one data segment;
sending, by the primary processor, the image header and at least one data segment to a secondary processor, the at least one data segment of the executable software image being directly stored within a target location of a system memory of the secondary processor, the target location allocated according to the image header;
receiving, by the primary processor, an indication from the secondary processor of successful receipt of the image header and at least one data segment;
sending, by the primary processor, an indication of termination of the executable image transfer; and
receiving, by the primary processor, an acknowledgment from the secondary processor of receipt of the indication of termination of transfer.

17. The method of claim 16 in which the image header comprises an image size and location in memory in which image data is located.

18. The method of claim 16 further comprising receiving, by the primary processor, a transfer request to the primary processor for each of the at least one data segment.

19. The method of claim 16 further comprising receiving, by the primary processor, a message from the secondary processor comprising an image identification, data offset, and data length.

20. The method of claim 19 further comprising sending data based on the message.

21. A multi-processor device comprising:
   means for receiving, by a primary processor, an instruction to transfer an image header for an executable software image, said executable software image comprising said image header and at least one data segment;
   means for sending, by the primary processor, the image header and at least one data segment to a secondary processor, the at least one data segment of the executable software image received being directly stored within a target location of a system memory of the secondary processor, the target location allocated according to the image header;
   means for receiving, by the primary processor, an indication from the secondary processor of successful receipt of the image header and at least one data segment;
   means for sending, by the primary processor, an indication of termination of the executable image transfer; and
   means for receiving, by the primary processor, an acknowledgment from the secondary processor of receipt of the indication of termination of transfer.

22. The multi-processor device of claim 21 in which the image header comprises an image size and location in memory in which image data is located.

23. The multi-processor device of claim 21 further comprising means for receiving, by the primary processor, a transfer request to the primary processor for each of the at least one data segment.

24. The multi-processor device of claim 21 further comprising means for receiving, by the primary processor, a message from the secondary processor comprising an image identification, data offset, and data length.

25. The method of claim 24 further comprising means for sending data based on the message.

26. A computer program product comprising:
   a non-transitory computer-readable medium having non-transitory program code recorded thereon, the non-transitory program code comprising:
      program code to receive, by a primary processor, an instruction to transfer an image header for an executable software image, said executable software image comprising said image header and at least one data segment;
      program code to send, by the primary processor, the image header and at least one data segment to a secondary processor, the at least one data segment of the executable software image being directly stored within a target location of a system memory of the secondary processor, the target location allocated according to the image header;
      program code to receive, by the primary processor, an indication from the secondary processor of successful receipt of the image header and at least one data segment;
      program code to send, by the primary processor, an indication of termination of the executable image transfer; and
      program code to receive, by the primary processor, an acknowledgment from the secondary processor of receipt of the indication of termination of transfer.

27. The computer program product of claim 26 in which the image header comprises an image size and location in memory in which image data is located.

28. The computer program product of claim 26 in which the non-transitory program code further comprises program code to receive, by the primary processor, a transfer request to the primary processor for each of the at least one data segment.

29. The computer program product of claim 26 in which the non-transitory program code further comprises program code to receive, by the primary processor, a message from the secondary processor comprising an image identification, data offset, and data length.

30. The computer program product of claim 29 in which the non-transitory program code further comprises program code to send data based on the message.

* * * * *